US011885563B2

(12) United States Patent
Chudnovsky et al.

(10) Patent No.: US 11,885,563 B2
(45) **Date of Patent: *Jan. 30, 2024**

(54) METHOD AND SYSTEM OF THERMO-VACUUM DRYING AND PROCESSING

(71) Applicant: UTILIZATION TECHNOLOGY DEVELOPMENT, NFP, Des Plaines, IL (US)

(72) Inventors: Yaroslav Chudnovsky, Skokie, IL (US); Dmytro Buyadgie, Pleasant Hill, CA (US); Olexiy Buyadgie, Clayton, CA (US); Oleksii Drakhnia, Pleasant Hill, CA (US)

(73) Assignee: UTILIZATION TECHNOLOGY DEVELOPMENT, NFP, Des Plaines, IL (US)

(*) Notice: Subject to any disclaimer, the term of this patent is extended or adjusted under 35 U.S.C. 154(b) by 31 days.

This patent is subject to a terminal disclaimer.

(21) Appl. No.: 17/683,748

(22) Filed: Mar. 1, 2022

(65) Prior Publication Data

US 2022/0268518 A1 Aug. 25, 2022

Related U.S. Application Data

(63) Continuation-in-part of application No. 16/728,793, filed on Dec. 27, 2019, now Pat. No. 11,261,560.

(60) Provisional application No. 62/785,769, filed on Dec. 28, 2018.

(51) Int. Cl.

| | |
|---|---|
| ***F26B 5/04*** | (2006.01) |
| ***D06F 58/26*** | (2006.01) |
| ***F26B 23/00*** | (2006.01) |

(52) U.S. Cl.
CPC .............. *F26B 5/042* (2013.01); *D06F 58/26* (2013.01); *F26B 23/004* (2013.01); *F26B 23/005* (2013.01)

(58) Field of Classification Search
CPC .......... D06F 58/24; D06F 58/10; D06F 58/30; D06F 58/206; F26B 5/042; F26B 23/004
USPC .......................................................... 34/86
See application file for complete search history.

(56) References Cited

U.S. PATENT DOCUMENTS

| | | | | |
|---|---|---|---|---|
| 3,642,182 A | | 2/1972 | Bhavsar | |
| 5,490,188 A | | 2/1996 | Snyder | |
| 5,765,293 A | * | 6/1998 | St. Louis | F26B 11/12 34/305 |
| 5,806,204 A | | 9/1998 | Hoffman et al. | |
| 6,105,273 A | * | 8/2000 | Johanson | F26B 3/305 34/267 |
| 6,671,978 B1 | | 1/2004 | McGowan et al. | |

(Continued)

FOREIGN PATENT DOCUMENTS

| | | |
|---|---|---|
| EP | 2 617 887 A1 | 7/2013 |
| EP | 2 617 887 B1 | 11/2018 |
| EP | 3 173 516 B1 | 1/2019 |

*Primary Examiner* — Stephen M Gravini
(74) *Attorney, Agent, or Firm* — Pauley Erickson & Swanson

(57) ABSTRACT

Methods and systems for the thermo-vacuum drying and processing of objects such as clothes. A vacuum ejector driven by high-pressure steam is employed to evacuate evaporated moisture mixed with air from a dryer vessel producing an intensification of the drying process such as can significantly reduce the energy and time requirements for the drying process and increase water utilization.

20 Claims, 7 Drawing Sheets

(56) References Cited

U.S. PATENT DOCUMENTS

| | | | |
|---|---|---|---|
| 9,255,732 | B2 | 2/2016 | Shu et al. |
| 9,605,897 | B2 | 3/2017 | Hyde et al. |
| 9,976,249 | B2 | 5/2018 | Lv et al. |
| 10,344,424 | B2 | 7/2019 | Kim et al. |
| 10,584,440 | B2 | 3/2020 | Kim et al. |
| 10,928,131 | B2 | 2/2021 | Krebs |
| 10,955,189 | B2 * | 3/2021 | Saribal .................... F26B 21/10 |
| 10,988,894 | B2 | 4/2021 | Kim et al. |
| 11,047,620 | B2 * | 6/2021 | Beutler ..................... F26B 5/06 |
| 11,261,560 | B2 * | 3/2022 | Chudnovsky ........... F26B 17/18 |
| 2006/0277690 | A1 | 12/2006 | Pyo et al. |
| 2013/0180125 | A1 | 7/2013 | Shu et al. |
| 2019/0112752 | A1 | 4/2019 | Dulberg et al. |
| 2020/0208335 | A1 | 7/2020 | Chudnovsky et al. |
| 2022/0268518 | A1 * | 8/2022 | Chudnovsky ......... F26B 23/004 |

* cited by examiner

METHOD AND SYSTEM OF THERMO-VACUUM DRYING AND PROCESSING

CROSS REFERENCE TO RELATED APPLICATION

This application is a continuation-in-part of U.S. patent application Ser. No. 16/728,793, filed on 27 Dec. 2019, which claims the benefit of U.S. Provisional Patent Application, Ser. No. 62/785,769, filed on 28 Dec. 2018. The co-pending parent application is hereby incorporated by reference herein in its entirety and is made a part hereof, including but not limited to those portions which specifically appear hereinafter.

STATEMENT REGARDING GOVERNMENT SPONSORED RESEARCH OR DEVELOPMENT

This invention was made with State of California support under California Energy Commission Contract Number 500-05-026. The Energy Commission has certain rights in the invention.

BACKGROUND OF THE INVENTION

Field of the Invention

This invention relates generally to drying processing such as can be employed for the drying of clothes, foods or other selected objects or materials, more particularly, the invention relates to methods and systems of thermo-vacuum drying and processing.

Description of Related Art

Conventional methods employed for the drying of objects such as clothes, foods and other types or forms of materials typically rely on the application of heat such as via a thermal process where heat is produced or results from combustion or electrical heating, for example. Such thermal processing is oftentimes combined with mechanical movements including, for example, rotating, shaking, conveying or others types or forms of movements such as may serve to assist in speeding the drying process and in the evaporation of remaining moisture from wet objects being dried.

For example, modern clothes drying is typically energy-intensive processing, consuming on average 630,000 Btu (664 MJ) of heat (for each 1000 lb. of wet laundry), which is released into the atmosphere along with 200 lb. of steam, intensifying the greenhouse effect and leading to evaporative losses of scarce water resources. Additionally, fans such as commonly employed in associated dryers to blow hot air through the same amount of laundry consume on average about 40 kW of power.

The drying process can be slow and extend over a prolonged period of time. In addition, the objects being dried may not be perfectly dried as, for example, some wet spots may remain such as due to unevenness of the drying process. Moreover, some or all of the evacuated moisture is likely subsequently ultimately released and dissipated into the atmosphere. The high latent heat of vaporization of water (e.g., 600 BTU/ft$^3$) makes direct evaporation drying processing highly energy intensive. In the case of direct contact of flue gasses with the objects being dried (e.g., clothes/materials), the objects being dried may additionally experience a deterioration in properties or parameters such as a loss of quality and/or color as well as experience absorption of VOCs and/or odors.

As identified above, existing technologies for clothes drying are generally related to direct heat contact with the product, mechanical movement (such as rotation, shaking, and conveying, for example), flue gas or hot air circulation, evacuation of moisture or humid air from the product and its complete lost by releasing it to the ambient. Steam has been used in or for pressing or ironing the product and cold air ventilation has served for odor removal from the product. At these services, the drying process for a load of 13 lbs. of clothes may last for 110 min or more, during which significant amounts of power or fuel, e.g., natural gas, are used, releasing significant amounts of NOx, $CO_2$ and other VOCs to the atmosphere. Vacuums have also been employed in such processing, but such vacuums are typically created or formed at the expense of electrically-driven vacuum pumps or the like and are not otherwise related to the thermal processes.

Thus, there is a need and demand for methods and systems for drying and processing that minimize and preferably avoid one or more of the above-identified problems or shortcomings of conventional drying processing.

SUMMARY OF THE INVENTION

In accordance with one embodiment, the subject thermo-vacuum drying method allows intensification of the drying process using a pressure and temperature difference that removes moisture 5-10 times faster than conventional drying methods. In one embodiment, the processing relies on heat produced by an integrated steam boiler. The heat circulates in a closed cycle between a vacuum ejector and a dryer volume or device such as a rotary drum dryer, conveyor, or a holoflite, for example. The system enables continuous heat recuperation and/or regeneration, which makes the process highly energy-efficient. Practice of the subject development can save up to 50% of the drying heat and almost 100% of the water entrained in the wet laundry. The recovered water can preferably, if desired, be recycled such as used to wash the next batch of laundry, and the surplus heat can be used to preheat the water. In a preferred embodiment, electrical power is consumed only for drum rotation and an automated control system. The combined energy factor (CEF) is expected to be 6.0 or higher, which is at least 50% higher than in conventional laundry dryers. Non-energy benefits of the subject thermo-vacuum drying method can include one or more of: simplicity of or in design, high durability, low maintenance requirements, and reduced operational cost.

As used herein, references to "high-pressure" gaseous flow, air or steam are to be understood as generally referring to steam at pressures of 21 psi to 1500 psi, that is steam at about 230° F. to 596° F. For thermo-vacuum process pressures at 100 psi to 120 psi that is steam at about 327° F.-341° F. are most common and economically viable.

In accordance with one aspect of the invention, methods for thermo-vacuum drying an object are provided.

In one embodiment, one such method involves inserting an object to be dried into an air-tight (e.g., sealed) thermo-vacuum dryer vessel. Heat is applied to the object in the thermo-vacuum dryer vessel to evaporate moisture from the object within the dryer vessel. Evaporated moisture is then evacuated from the dryer vessel via a vacuum ejector driven by high-pressure gaseous flow, such as compressed air or steam. Residual air content entrained to the dryer vessel such as during product charging and/or via improper sealing is removed as well by the vacuum ejector and strained out of the system such as via an air-relief or air-release valve such as appropriately disposed after the ejector.

In another embodiment, a method for thermo-vacuum drying an item of clothing is provided. In one such method, the item of clothing to be dried is inserted into a sealed thermo-vacuum dryer vessel. Heat is applied to the item of clothing in the thermo-vacuum dryer vessel to evaporate moisture from the item within the dryer vessel. A generated high-pressure steam is introduced into a vacuum ejector to create a vacuum evacuating evaporated moisture from the dryer vessel. Air volumes, penetrated to the dryer vessel through non-tight sealing and such are typically deemed insignificant, are also evacuated by a vacuum ejector leaving the dryer vessel free of air.

In accordance with another aspect of the invention, systems for thermo-vacuum drying an object are provided.

In one embodiment, a system for thermo-vacuum drying an object includes a thermo-vacuum dryer vessel and one or more associated vacuum ejector(s). In the system, the thermo-vacuum dryer vessel acts or serves to apply heat to an object therein contained to evaporate moisture from the object. The vacuum ejector is in communication with the thermo-vacuum dryer vessel such that the vacuum ejector, upon actuation, serves to evacuate at least a portion of the evaporated moisture from within the thermo-vacuum dryer vessel, leaving an object that has been appropriately dried.

In accordance with another aspect of the invention, systems for vacuum extraction from and/or drying an object are provided.

In one embodiment, a method for vacuum extraction from an object includes inserting the object into a vacuum vessel, generating a high pressure gaseous flow, and introducing at least a portion of the high pressure gaseous flow into a vacuum ejector connected to the vessel to create a vacuum evacuating a component from the vessel, such as evaporated moisture, mixed with air from the dryer vessel.

The invention further includes a method for thermo-vacuum drying or otherwise treating an object, such as clothing, food, or agricultural components, including inserting the object into a thermo-vacuum dryer vessel, generating high pressure gaseous flow, and introducing at least a portion of the high pressure gaseous flow into a vacuum ejector connected to the dryer vessel to create a vacuum evacuating evaporated moisture mixed with air from the dryer vessel.

The high pressure gaseous flow can be any suitable gaseous material, such as using steam or compressed air. The high pressure gaseous flow does not pass through the vacuum vessel, and indirectly extracts the intended material from the vessel using the ejector. Heat can be applied to the vessel, such as heat in the mixed flow exiting the ejector.

The invention further includes a method for thermo-vacuum drying an object including: receiving the object into a thermo-vacuum dryer vessel; generating a high-pressure gaseous flow; introducing the high-pressure gaseous flow (e.g., steam or compressed air/gas) through a vacuum ejector, from a first inlet of the vacuum ejector to an outlet of the vacuum ejector, to create a vacuum though a second inlet of the vacuum ejector, the second inlet connected to the thermo-vacuum dryer vessel; evacuating evaporated moisture from the dryer vessel through the second inlet of the vacuum ejector, wherein each of the gaseous flow and the evaporated moisture from the dryer vessel exit the outlet of the vacuum ejector.

Embodiments of the invention further include applying heat to the object in the thermo-vacuum dryer vessel for evaporating moisture from the object within the dryer vessel. The heat is desirably indirectly applied through a heat exchanger in combination with the dryer vessel. The heat exchanger preferably surrounds the dryer vessel and receives heat from the outlet of the vacuum ejector, and no high-pressure gaseous flow nor evaporated moisture from the outlet of the vacuum ejector contacts the object within the dryer vessel.

The invention further includes a system for extraction from and/or drying of an object. The system includes a vacuum vessel, such as a thermo-vacuum dryer vessel, to apply vacuum to an object therein contained to extract gaseous components and/or evaporate moisture from the object. A vacuum ejector is in communication with the vacuum vessel, the vacuum ejector having a gaseous flow passage, including a flow inlet and a flow outlet, and an extraction or moisture inlet connected to the vacuum vessel. The vacuum ejector, upon actuation, affects evacuation of at least a portion of a gas or evaporated moisture from the thermo-vacuum dryer vessel through the moisture inlet.

The gaseous flow passage is configured to receive a high pressure flow of a gaseous material such as air or steam. In embodiments of this invention, a compressor is included to generate high-pressure air or other gas. The compressor is in pressurized air transfer communication with the vacuum ejector to affect the evacuation of a material such as evaporated moisture mixed with air from the dryer vessel.

In embodiments of this invention, a heat exchanger is integrated with the vessel and configured to receive outlet vapor from the vacuum ejector and transfer heat to the vessel from the outlet vapor. Preferably no outlet vapor from the outlet of the vacuum ejector contacts the object within the dryer vessel.

Other objects and advantages will be apparent to those skilled in the art from the following detailed description taken in conjunction with the appended claims and drawings.

DETAILED DESCRIPTION

Figure 1:
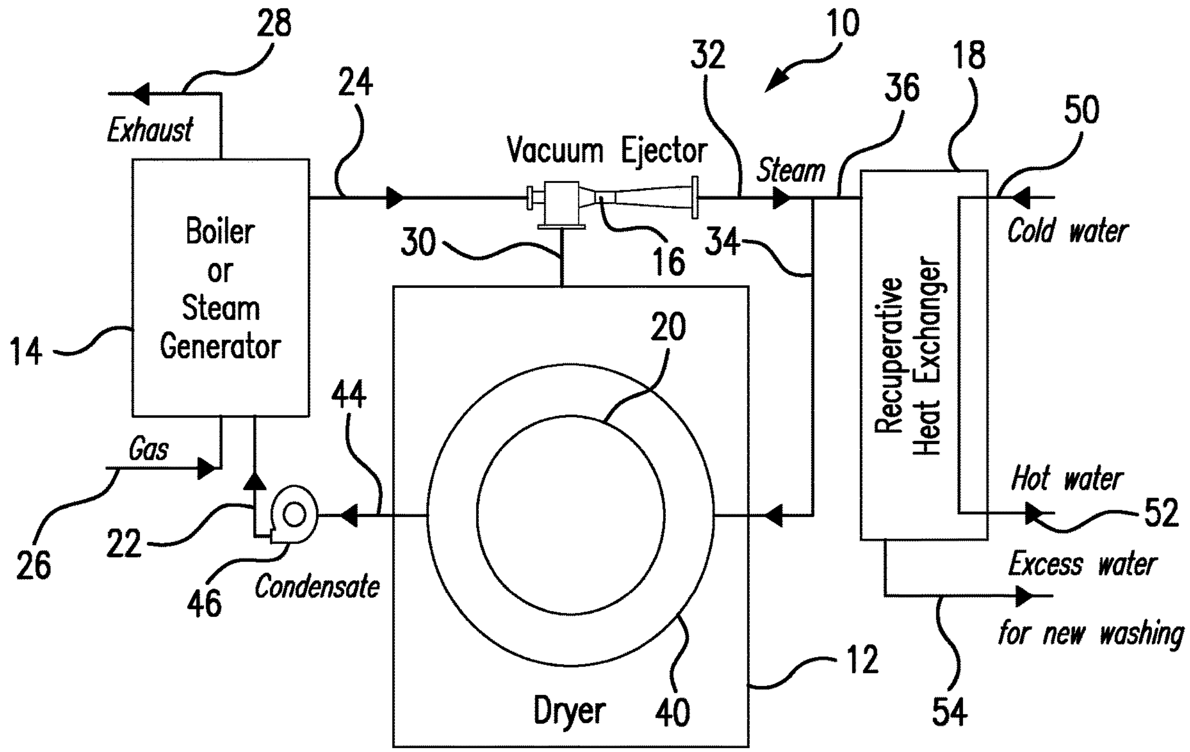
FIG. 1 is a simplified schematic of a system in accordance with one embodiment of the invention.

In accordance with one preferred embodiment of the invention, the drying or processing of objects such as clothes and other types or forms of bulk materials is carried out at the expense of combustion of fossil fuels and/or utilization of renewable and/or waste heat. The drying process is desirably further intensified by or through the application of a vacuum, such as produced at the expense of heat and an associated ejector. Hot moisture, e.g., evacuated from the dried clothes/material, can then be utilized for the next batch of clothes laundry/washing/bleaching or material processing, etc.

In accordance with one embodiment, the method is conducted as follows: In a boiler/steam generator, such as heated by products of fossil fuel combustion or renewable heat, a high pressure steam is generated. This high pressure steam is directed to a nozzle of an associated ejector to produce a vacuum to evacuate steam-air mixture from the drum/vessel of a dryer device that contains the clothes/material to be dried. Leaving the ejector, the steam-air mixture at close to ambient pressure is separated in a separator. Air can desirably be released or discharged from the system such as through an air-relief or air-release valve, such as known in the art. As used herein, references to such "air" are to be understood as generally referring to the volume of air such as contained in the dryer vessel after product charging or penetrated into the dryer vessel through the non-tight sealing, such penetration into the dryer vessel through the non-tight sealing might commonly be deemed as being parasitical.

The steam can be directed to a heat exchanger, inside the drum/vessel that release the steam condensation heat to the loaded clothes/materials. As a result of thermal and vacuum processes, the moisture from clothes/materials is evacuated much faster than only through thermal heating. Consequently, processing in accordance with the subject invention development can desirably speed up the drying process by at least 2-5 times. A condensate after the heat exchanger, is split into two streams: one is returned to the boiler for steam generation to repeat the heating cycle, while surplus moisture from the dried batch of clothes/materials can be directed to the laundry/washing/bleaching of the next batch of clothes/materials processing.

The combined utilization of heat is a distinctive and unique feature of the invention. That is in accordance with a preferred embodiment of a system and processing of the subject development, this heat is utilized two times: once for clothes/material heating and a second time for the production of a vacuum for intensification of the drying process. As an additional benefit, the heat can desirably be regenerated in the cycle through the condensate return, while the excess condensate serves for next batch washing, such as resulting in a savings of at least 20-30% of the water for washing. This is or can be extremely important such as in areas suffering from fresh water scarcity. Moreover, the subject development and associated processing desirably does not involve any direct contact of flue gases with the object being dried, nor is the heat and moisture released to the ambient environment, but instead is fully recuperated in the system.

FIG. 1 is a simplified schematic of a system, generally designated 10, in accordance with one embodiment of the invention. As shown, the system 10 principally includes a dryer device 12, a boiler or steam generator 14, a vacuum ejector 16, and a recuperative heat exchanger 18 each operatively connected such as shown.

The dryer device 12 includes a dryer vessel 20 such as in the form of a rotary drum and into which dryer vessel one or more objects to be dried (not shown), e.g., such as one or more items of clothing, are placed.

The boiler or steam generator 14 operates to convert water or moisture input, such as from a line 22, into a stream of high-pressure steam, shown as line 24. Natural gas enters the boiler or steam generator 14 via the line 26 and is burned or otherwise combusted therein producing 1) heat used to heat the water or moisture input into a flow of high pressure steam and 2) combustion exhaust shown as exiting the boiler or steam generator 14 via the line 28.

While the boiler or steam generator 14 is shown as operating utilizing natural gas, those skilled in the art and guided by the teachings herein provided will understand and appreciate that the broader practice of the invention is not necessarily limited by the fuel source or material utilized therein. For example, the combustion of other fossil fuels and/or utilization of renewable and/or waste heat can be utilized in the practice of the invention.

The high-pressure steam of line 24 is directed to a nozzle of the associated vacuum ejector 16 to produce a vacuum to evacuate steam-air mixture via a line 30 from the dryer device 12, more specifically from the drum/vessel of the drier device. As will be described and shown in embodiments below, the air can be separated from the steam-air mixture and appropriately released or discharged such as by an appropriate air-relief or air-release valve (not shown).

Steam from the vacuum ejector 16 such in a line 32 can be split into lines 34 and 36. As shown, steam of line 34 can be directed to the heat exchanger 40 shown as surrounding the dryer vessel 20.

Figure 2:
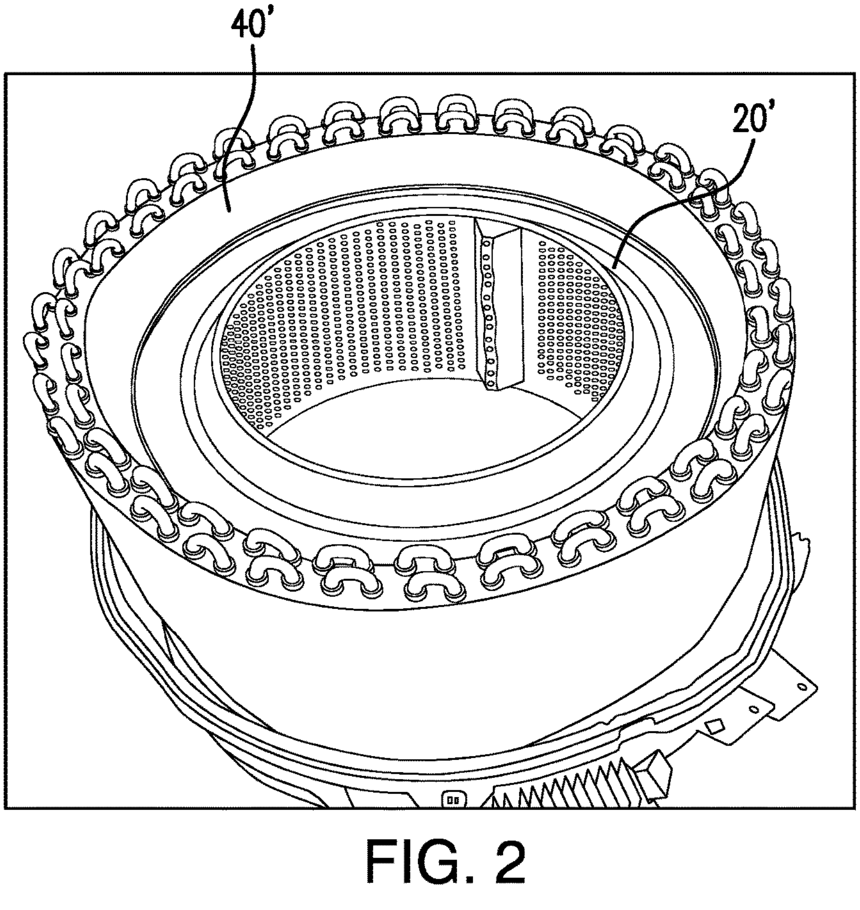
FIG. 2 illustrates a dryer vessel in accordance with one embodiment of the invention.

FIG. 2 illustrates a dryer vessel 20' such as in the form of a rotary drum with a surrounding heat exchanger 40' in accordance with one embodiment of the invention. Returning to FIG. 1, the steam directed to the heat exchanger 40 acts or serves to release steam condensation heat to the loaded clothes/materials. With such heat release, steam condensate is removed from the dryer 12 such as via a line 44 and a condensate pump 46 and may, if desired, be conveyed via the line 22 for use in the boiler or steam generator 14.

As shown, a portion of the steam released from the vacuum ejector 16, shown as a stream in a line 36 can be directed to the recuperative heat exchanger 18 such as for use in heating incoming cold water, shown as entering via a line 50, to produce hot water, shown as exiting via a line 52. Steam condensate resulting from such heat exchange is shown as exiting the recuperative heat exchanger 18 via a line 54 and such as can be utilized as excess water for new wash, or such other uses as may be desired in particular applications.

Figure 3:
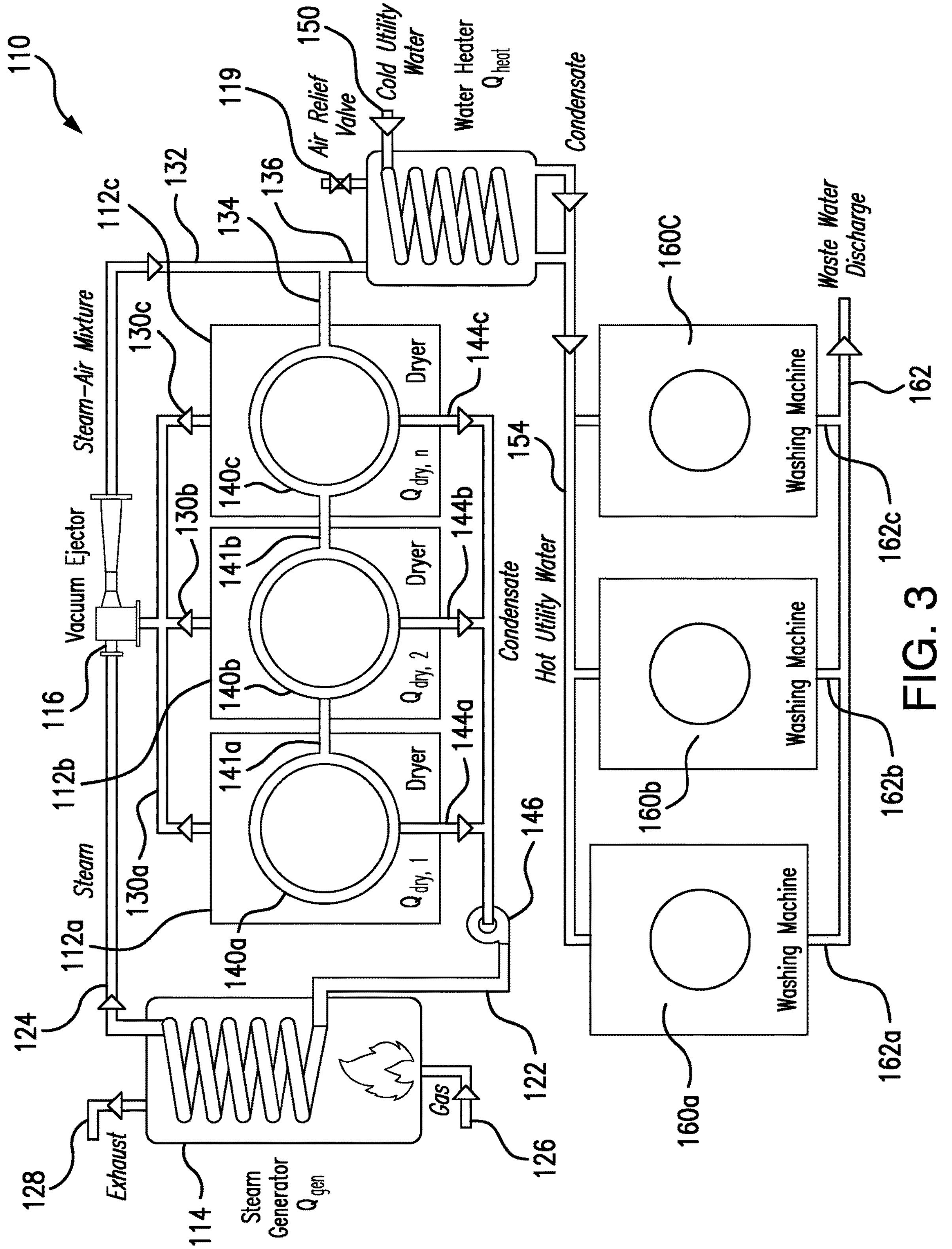
FIG. 3 is a simplified schematic illustrating a clothes dryer integrated into an industrial laundry system in accordance with one embodiment of the subject development.

FIG. 3 illustrates an industrial laundry system, generally designed by the reference numeral 110, including the integration of multiple clothes dryers, here specifically shown as dryers 112*a*, 112*b*, and 112*c* in accordance with one embodiment of the subject development.

The industrial laundry system 110, similar to the system 10 shown in FIG. 1 and described above, includes a boiler or steam generator 114 operates to convert water or moisture input, such as from a line 122, into a stream of high pressure steam, shown as line 124. Natural gas enters the boiler or steam generator 114 via a line 126 and is burned or otherwise combusted therein producing 1) heat used to heat the water or moisture input from the line 122 into a stream of high pressure steam 124 and 2) combustion exhaust shown as exiting the boiler or steam generator 114 via a line 128. While the boiler or steam generator 114 is shown as operating utilizing natural gas, again those skilled in the art and guided by the teachings herein provided will understand and appreciate that the broader practice of the invention is not necessarily limited by the fuel source or material utilized therein. To that end, other fuel materials and sources such as will be apparent to those skilled in the art can be utilized, if desired.

The high pressure steam of line 124 is directed to a nozzle of an associated vacuum ejector 116 to produce a vacuum to evacuate steam-air mixtures via lines 130*a*, 130*b*, and 130*c*, respectively from dryer devices 112*a*, 112*b*, and 112*c*, more specifically from the drum/vessel of the respective dryer device.

Leaving the vacuum ejector 116 is a steam-air mixture in a line 132. If desired, air can be released or discharged from the system such as through an air-release valve (not shown). Steam, in a line 134, can be introduced to a heat exchanger 140*c*, inside the dryer 112*c* such as to release steam condensation heat to the clothes/materials loaded therein. The resulting steam from heat exchanger 140*c* inside the dryer 112*c* can be conveyed via a line 141*b* to a heat exchanger 140*b* inside the dryer 112*b* such as to release steam condensation heat to the clothes/materials loaded therein. The resulting steam from heat exchanger 140*b* inside the dryer 112*b* can be conveyed via a line 141*a* to a heat exchanger 140*a* inside the dryer 112*a* such as to release steam condensation heat to the clothes/materials loaded therein.

Steam condensate is removed from dryer devices 112*a*, 112*b*, and 112*c*, such as via lines 144*a*, 144*b*, and 144*c*, and condensate pump 146 and may, if desired, be conveyed via the lines 122 for use in the boiler or steam generator 114.

A portion of the steam-air mixture resulting from the vacuum ejector 116 is conveyed via a line 136 to a water heater device 118. The water heater device 118 may include or incorporate an air-relief or air-release valve 119 to release or discharge air from the system, if desired. Cold utility water is introduced into the water heater device 118 via a line 150 to be heated in the water heater device 118 via the steam and/or air from the line 136 and to result in hot utility water. Utility hot water and condensate resulting from the water heating device 118 can be appropriately conveyed from the water heater 118 via a line 154 to hot water use devices such as washing machines 160*a*, 160*b*, and 160*c*. Thus, it is to be appreciated that in a system 110 such as shown in FIG. 3, at least a portion of the condensate-containing stream in the line 154 can be conveyed to a washer device or other condensate consuming service such as to form an additional object for subsequent thermo-vacuum drying in accordance herewith.

In turn, wastewater resulting from the washing machines 160*a*, 160*b*, and 160*c* is passed via the lines 162*a*, 162*b*, 162*c* and 162 to a waste or other appropriate water discharge.

Figure 4:
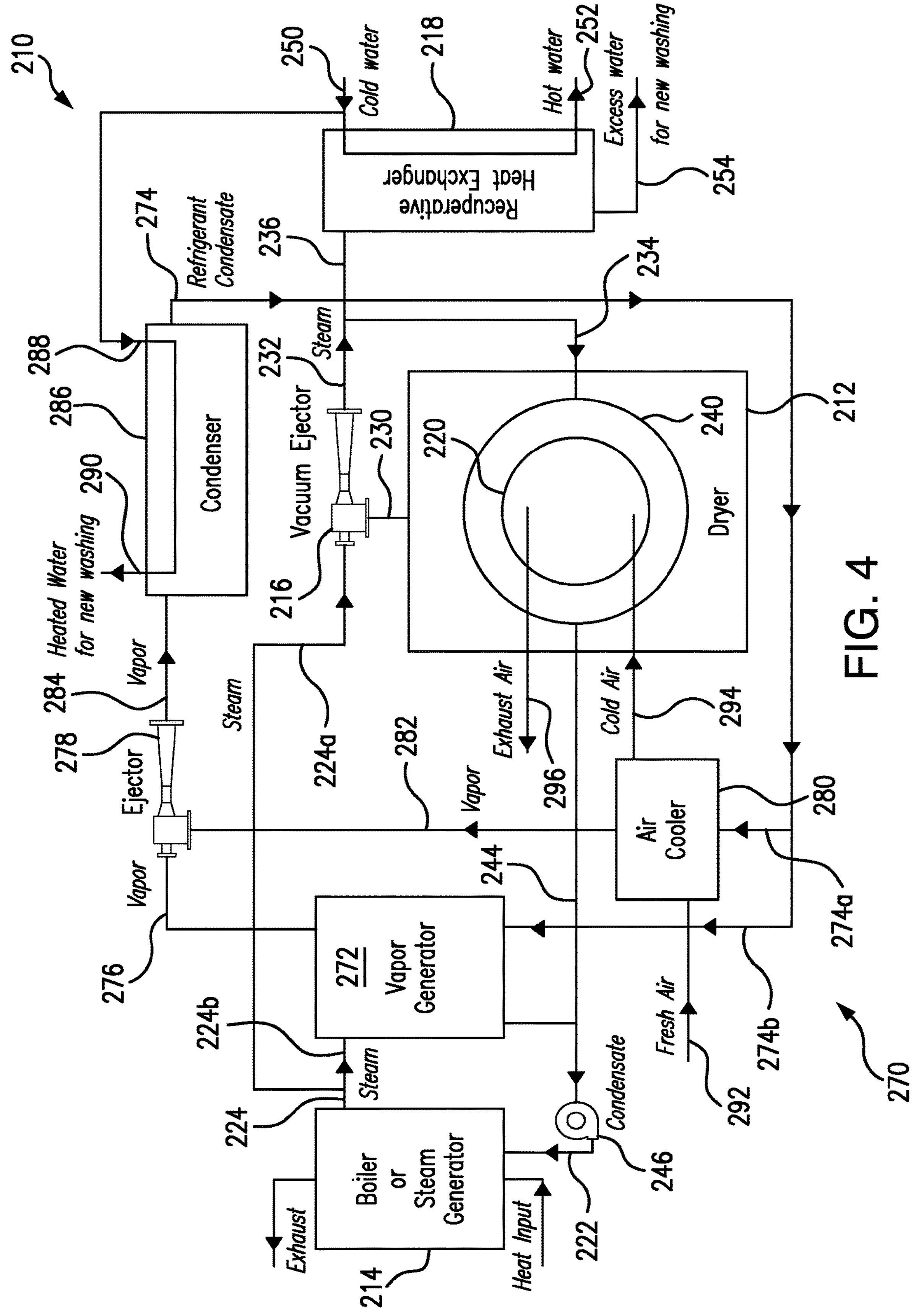
FIG. 4 is a simplified schematic of a system in accordance with another embodiment of the invention and now including a thermally driven refrigeration system that operates together with or one after another with the thermo-vacuum drying processing.

Turning to FIG. 4, there is illustrated a laundry system, generally designated by the reference numeral 210, in accordance with another embodiment of the invention and now including a thermally driven refrigeration system that operates in conjunction with thermo-vacuum drying processing, such as described above.

The system 210, similar to the systems 10 and 110 described above, includes a boiler or steam generator 214 operable to convert water or moisture input into a stream of high-pressure steam, shown as conveyed via a line 224. Water or moisture input into the boiler or steam generator 214 is shown as via a line 222.

At least a portion of the high pressure steam of line 224 is directed via a line 224*a* to a nozzle of the associated vacuum ejector 216 to produce a vacuum to evacuate steam-air mixture via a line 230 from the dryer device 212, such as from a drum/vessel 220 of the dryer device 212.

Similar to the system 10 shown in FIG. 1, steam or vapor from the vacuum ejector 216 such in a line 232 can be split into lines 234 and 236. As shown, the steam of line 234 can be directed to a heat exchanger 240 shown as surrounding a dryer vessel 220 within the dryer device 212. The steam directed to the heat exchanger 240 acts or serves to release the steam condensation heat to the loaded clothes/materials. With such heat release, steam condensate is removed from the dryer 212 such as via a line 244 and a condensate pump 246 and may, if desired, be conveyed via the line 222 for use in the boiler or steam generator 214.

As shown, a portion of the steam released from the vacuum ejector 216, shown as a stream in a line 236 can be directed to the recuperative heat exchanger 218 such as for use in heating incoming cold water, shown as entering via a line 250, to produce hot water, shown as exiting via a line 252. Steam condensate resulting from such heat exchange is shown as exiting the recuperative heat exchanger 218 via a line 254 and such as can be utilized as excess water for new wash, or such other uses as may be desired in particular applications.

As identified above, the laundry system 210 incorporates and utilizes a thermally driven Ejector Refrigerating System (ERS), generally designated by the reference numeral 270. As further detailed below, the thermally driven refrigeration system 270 may desirably be in or of the form of an Ejector Refrigerating System such as operating with low-boiling point refrigerants such as R32, R1233 zde, R1234 yf, etc., for example.

Steam from the boiler or steam generator 214 is introduced via a line 224*b* into a vapor generator 272. The steam condenses in the vapor generator 272 and transfers heat to the refrigerant (liquid) such as introduced into the vapor generator 272 via a line 274*b*. The refrigerant evaporates and is passed as high-pressure vapor via a line 276 to an ejector 278. The ejector 278 is used in the Ejector Refrigerating System 270 to produce cooling capacity for the post-drying freezing of the object or objects being processed (e.g., clothes or other materials).

The ejector 278 entrains low-pressure refrigerant vapor from an associated air-cooler 280, producing the cooling capacity discussed in greater detail below. The vapor is communicated to the ejector 278 via a line 282. The vapors of lines 276 and 282 are combined, mixed and compressed in the ejector 278 to the condensation pressure. Mixed vapors are conveyed via line 284 to a condenser 286. The condenser 286 serves to condense the refrigerant vapors, shown as exiting the condenser via a line 274, and releasing heat to a counterflowing stream of cold or non-heated water, shown as entering the condenser 286 at inlet 288, with the heated water, shown as exiting the condenser 286 at outlet 290. As will be appreciated, such resulting hot water can find suitable application such as in a subsequent washing of clothes, for example.

The refrigerant condensate in the line 274 can be split with a portion conveyed via a line 274*a* to the air cooler 280 and a portion conveyed via the line 274*b* to the vapor generator 272. To that end, the laundry system 210 may appropriately contain or include a refrigerant feeding pump (not shown) placed on the line 274*b* for pumping the liquid refrigerant from the low-pressure condenser 286 to the high-pressure vapor generator 272. Additionally, the laundry system 210 may include or contain a throttle valve (not shown) on line 274*a* such as serving to expand the liquid pressure to the suction pressure level before evaporation at the air-cooler 280 and suction into the ejector 278 via the line 282.

As shown the air cooler 280 can act to cool a fresh intake of air, such a from a line 292, to produce cold air introduced into the drum/vessel 220 via a line 294 to act on the clothes therein contained. Exhaust air is shown as exiting the drum/vessel 220 of the dryer device 212 via a line 296.

As will be appreciated by those skilled in the art and guided by the teachings herein provided, such incorporation or inclusion of post-drying treatment such as by subjecting the dried clothes to freezing may be particularly desirable to free the clothes of materials whose byproducts induce severe allergic reactions. Materials whose byproducts can or may induce severe allergic reactions can include bacteria, saprophytes, dust mites and combinations thereof. For example, the incorporation or inclusion of post-drying freezing treatment may be particularly advantageously applied in processing such as the laundry processing of clothes (e.g., linens) to ensure removal of mites and the like. For food products or other sensible materials, post-drying freezing can be a requirement for further transportation protecting from spoiling at ambient temperature influence or bacteria growth.

Subjecting objects being treated, such as clothes, to a post-drying treatment of low-temperature cooling can have beneficial results such as improving whitening effect and assisting in imparting a fresh smell to the treated object(s). Thus, some preferred embodiments desirably include or incorporate a post-drying treatment of low-temperature cooling. For example, the treatment of low-temperature cooling may suitably involve utilizing low-grade heat from the thermo-vacuum drying process residuals to produce in an ejector refrigerating machine cooling processing at a temperature of 30° F. to 14° F. or even lower, if desired.

Figure 5:
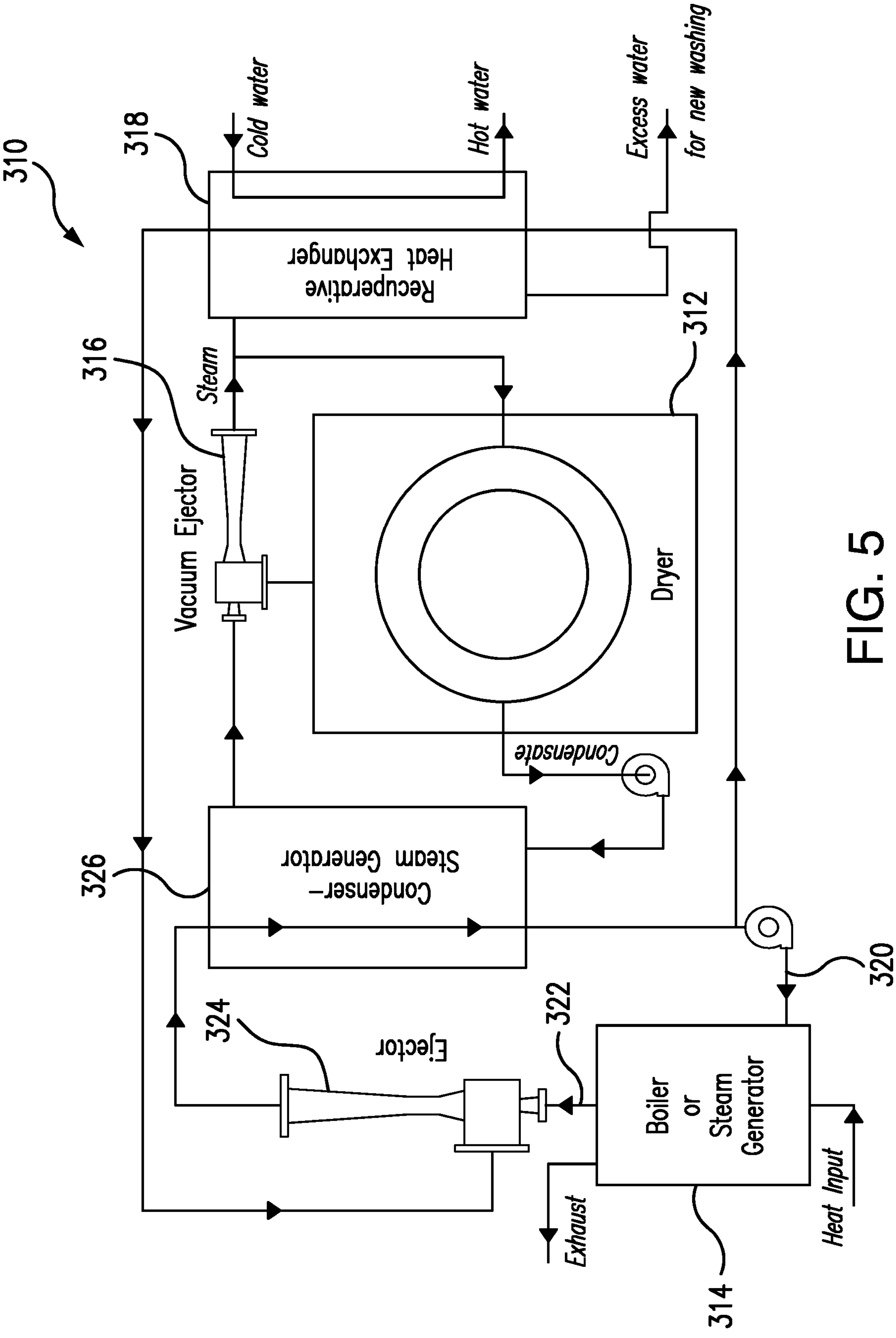
FIG. 5 is a simplified schematic of a system in accordance with another embodiment of the invention and now including a heat pump system.

Turning to FIG. 5, there is illustrated a laundry system, generally designated by the reference numeral 310, in accordance with another embodiment of the invention and now including and utilizing a heat pump system such as may be incorporated and utilized to increase of energy efficiency and overall performance of the proposed invention.

In contrast to previously described embodiments which utilized heat, after the drying process, for water heating applications, this embodiment allows realization of the heat pumping effect and may find particular application when more heat is required for water heating (and boiler capacity permits). In this embodiment, steam is circulated between the boiler, the condenser steam generator, and a recuperative heat exchanger, while an ejector's role is the steam heat pump to improve energy characteristics of the system.

The system 310, similar to the systems described above, includes a dryer device 312, a boiler or steam generator 314, a vacuum ejector 316, and a recuperative heat exchanger 318.

In the system 310, the boiler or steam generator 314 operates to convert water or moisture input, such as from a line 320, into a stream of high-pressure steam, shown as line 322.

The high-pressure steam of line 322 is directed to a nozzle of the associated ejector 324. The ejector 324 in essence operates as a heat pump, using motive steam from the boiler 314 and entraining secondary steam-water mixture from the recuperative heat exchanger 318—it supplies 2 units of steam to a condenser-steam generator 326 to operate the vacuum ejector 316 for the drying process.

Figure 6:
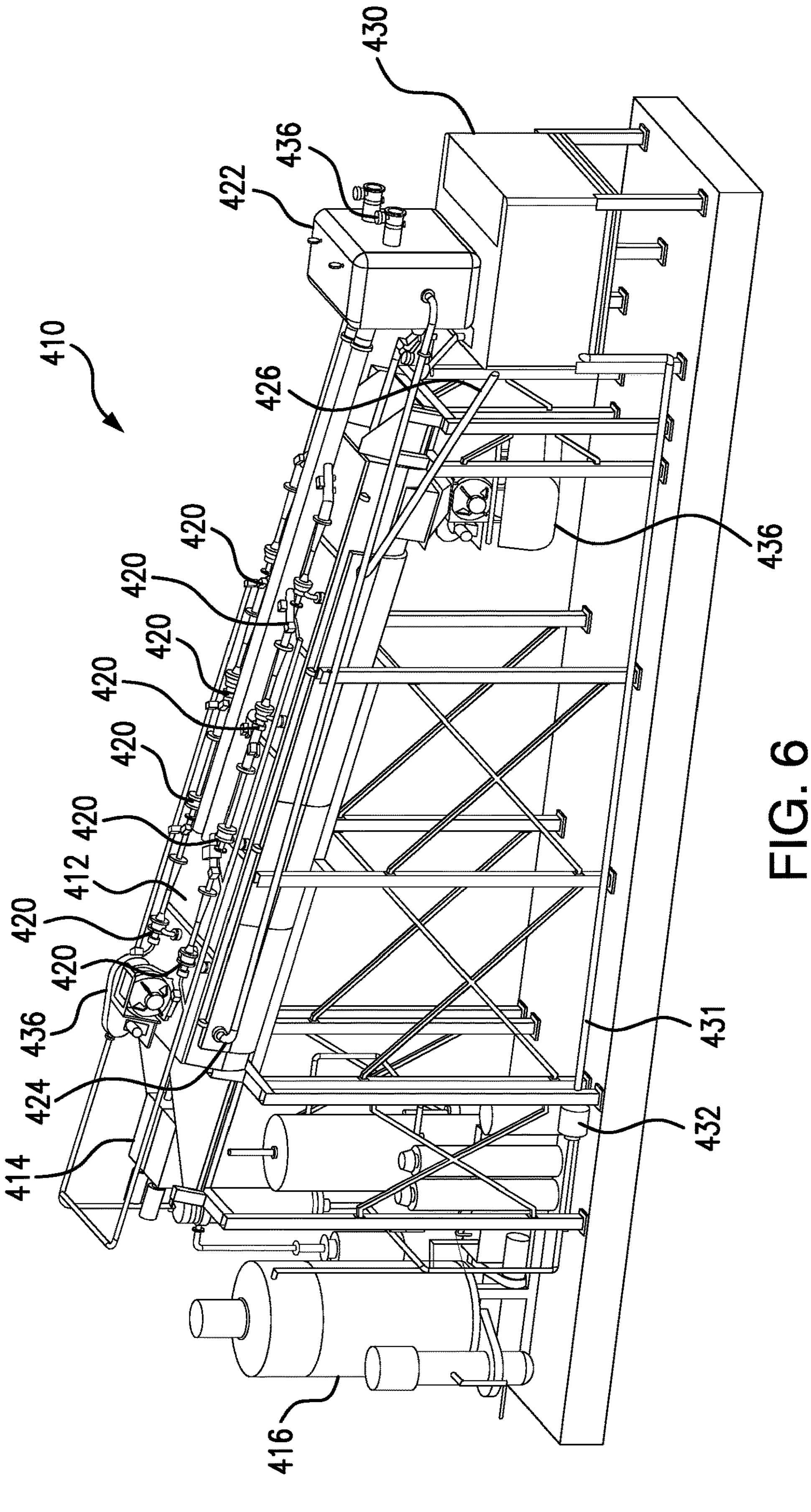
FIG. 6 depicts a bulk food dryer system in accordance with another embodiment of the invention.

FIG. 6 depicts a bulk food dryer system, generally designated by the reference numeral 410, in accordance with another embodiment of the invention.

The bulk food dryer system 410 includes a holoflight food product dryer processing unit 412 and such as having a motor 414 to drive flights within the holoflight unit 412 to appropriately advance the object of food product being processed thereby. The bulk food dryer system 410 also generally comprises or includes a boiler or steam generator assembly 416 to provide driving energy, such as in the form of high-pressure steam, in or to the system. The high-pressure steam produced or supplied by the boiler assembly 416 enters into eight vacuum ejector nozzles 420 spaced and distributed adjacent about the holoflight unit 412. Those skilled in the art and guided by the teachings herein provided will understand and appreciate that the number of ejectors for or in use in particular applications can appropriately vary, dependent on the specific application and capacity, for example.

The ejector nozzles 420 and serve to entrain steam, from the product located in a drying cavity of a holoflight 412, to form a mixed steam. After the ejectors, the mixed steam is directed to a steam distribution tank 422 from which the steam is split and directed separately to the flights and to an inlet 424 to a holoflight unit jacket with a goal to transfer heat to the product contained in the holoflight 412. The mixed steam can be supplied directly to the flights and jacket avoiding the steam distribution tank, if desired. The flights and the jacket are preferably hollow, to allow steam to be easily distributed therewithin and for the product to be heated through the walls of flights and jacket. As heat from the steam is released to the product, the steam condenses and flows via a condensate return line 426 to a tank 430—part of which is returned or conveyed (such as via a line 431 and a pump 432) to the boiler 416 with excess condensate being removed from the system. Air-lock valves 434 at the top and bottom of the holoflight 412 serve as an air trap while infeeding and outfeeding of the product inside the holoflight 412. Though some small portion of air may still be present in the system, such remaining air can be removed in the steam distribution tank 422 by one or more air-relief or air-release valves 436 or the like.

It is to be understood that particular embodiments of the invention can appropriately be practiced employing different types of drying systems, including continuous and batch operations. For example, a continuous supply laundry process leads to infiltration, such as of air, for example, from an outside environment, e.g., external, to the drying system. In such a situation, appropriate pressure reduction in the drying chamber can be determined by ejector characteristics, with the pressure reduction limit generally defined by final moisture content and other specifically selected factors, for example. In batch operation, a batch of laundry product can be appropriately supplied to a chamber with the chamber being sealed and the pressure within the sealed chamber reduced up to a deep vacuum, with pressure reductions being dependent on factors such as, for example, suction time, matter being evacuated, e.g., air, gas, or liquid, degree of leakage, etc.

The invention represents a novel approach towards the most rational utilization of energy sources, boosting the speed of clothes drying, improving the quality of the dried clothes and desirably limiting the moving of parts in the system such as to only rotation of the drum of a dryer and for air-trapped product infeed and outfeed devices (at continuous drying process only). In the case of the use of natural gas as a driving energy source, the incorporation and utilization of a gas boiler may become an additional device supporting the operation of the system.

It is believed that the subject processing will have a transformational impact on the state-of-the-art clothes drying process, leading to at least 50% energy savings in the commercial cloth drying sector. Furthermore, it is anticipated that the subject processing will save significant amounts of water, which can be recycled to reduce, by at least 20% or more, the amount of water required to be drawn to wash a subsequent load of laundry. The recovered heat can be used to reduce, by at least 10% or more, the energy needed for water preheating. Furthermore, improved washing processing through the practice of the invention also may desirably increase the average life of laundered fabrics by 100% or more. Large-scale deployment of the subject development can be expected to result in at least 250 TBTU of overall energy savings and a 5-10 times reduction in the time required for the drying process. Additionally, because the technology allows dryers to be more compact, thermo-vacuum dryers that take up only half as much space as conventional dryers are anticipated.

Figure 7:
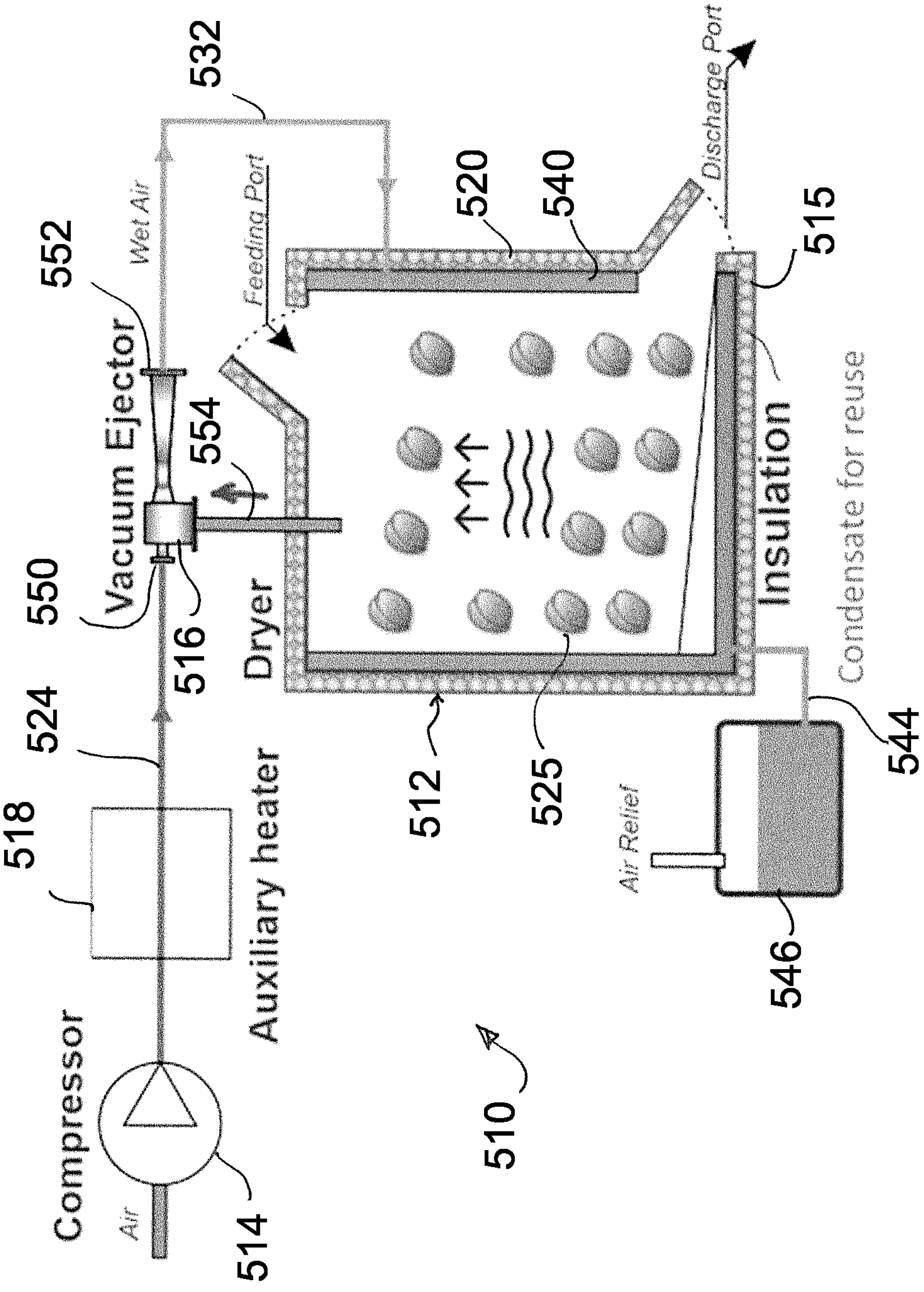
FIG. 7 is a simplified schematic of a system in accordance with another embodiment of the invention.

FIG. 7 shows a simplified schematic of a system, generally designated 510, in accordance with another embodiment of the invention. As shown, the system 510 principally includes a dryer device 512, a compressor 514 (e.g., an air compressor), and a vacuum ejector 516, each operatively connected such as shown.

The dryer device 512 includes a dryer vessel 520 such as in the form of a stationary drying bin, tank or container, with a drying volume chamber into which objects to be dried, e.g., clothes, seed 525, feed, or other plant agricultural material, are placed.

The compressor 514 creates a high-pressure gaseous flow of compressed air, shown as line 524. The compressed air is generally heated by the compression process, but can optionally be further preheated if needed (such as contingent on the type of product object and its initial moisture content) by any suitable heating source 518 (e.g., using waste heat or fuel such as fossil, low-carbon, hydrogen and blends, biofuel, renewables, etc.).

The high-pressure gaseous flow of line 524 is directed to an inlet nozzle 550 of the associated vacuum ejector 516 to produce a vacuum to evacuate moisture (wavy lines) from the dryer vessel 520 via line and second inlet 554 of the ejector 516. Vapor laden air from the outlet 552 of the vacuum ejector 516, in line 532, can used as described above. As shown, vapor line 532 is directed to a heat exchanger 540 shown as integrated with and/or at least partially surrounding the dryer vessel 520. The dryer wall 515 is also shown as insulated to mitigate the heating losses. Condensate leaves the heat exchanger via line 544 and is collected in tank 546 for reuse (e.g., the initial object (product being dried) washing, or irrigation, ware washing, facility services, etc.) or disposal.

Figure 8:
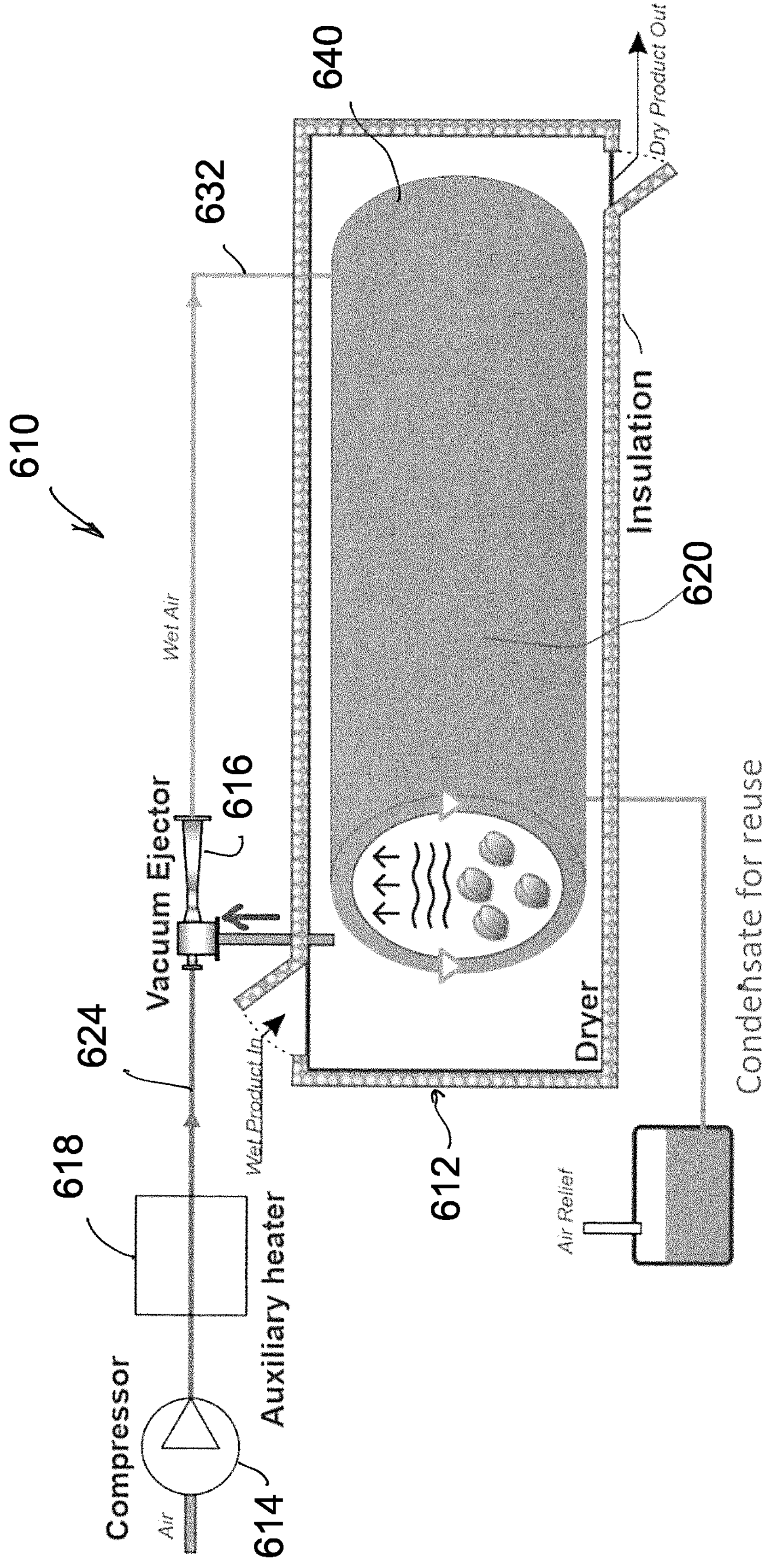
FIG. 8 is a simplified schematic of a system in accordance with another embodiment of the invention.

In the embodiment of FIG. 7, the feeding and discharge doors generally operate in an open-close mode, such as based upon a moisture sensor signal indicating a reaching of the targeted (preset) product moisture content within the dryer. FIG. 8 shows a simplified schematic of a system with an alternative dryer vessel, namely a continuous operation dryer vessel.

FIG. 8 shows system 610 with dryer device 612, a compressor 614 (e.g., an air compressor), and a vacuum ejector 616 each operatively connected such as shown. The compressor 614 again creates a high-pressure gaseous flow of compressed air, shown as line 624 with optional heater 618.

The dryer device 612 includes a dryer vessel 620 such as in the form of an agitating drying drum, for example, a rotary drum and/or including an auger, flipper, agitator, etc. within a drying volume chamber. The dryer device 612 is used with a suitable component or subsystem (e.g., conveyor or chute) that provides an adjustable (depending on product throughput and required final moisture content) transportation of the product to and/or through a feeding port to discharging port during the continuous operation. As shown, vapor line 632 is directed to a heat exchanger 640 shown as integrated with and/or at least partially surrounding the dryer vessel 620.

While the invention has been described above making specific reference to the drying of objects, such as clothes and laundry processing, those skilled in the art and guided by the teachings herein provided will understand and appreciate that the broader application and/or practice of the invention is not necessarily so limited. For example, it is to be understood that the invention can, if desired and with appropriate modification and selection of operating conditions and parameters, be applied or utilized in connection with or for the extraction of targeted materials in various applications. Particular examples of such applications include the extraction of volatile components from raw materials such as the removal of alcohol from sugar cane meal, beetroot, grape or other fruits or sources as well as the extraction of an active or targeted component from medical raw materials as well as from other types of products and/or materials.

The subject development illustratively disclosed herein suitably may be practiced in the absence of any element, part, step, component, or ingredient which is not specifically disclosed herein.

While in the foregoing detailed description the subject development has been described in relation to certain preferred embodiments thereof, and many details have been set forth for purposes of illustration, it will be apparent to those skilled in the art that the subject development is susceptible to additional embodiments and that certain of the details described herein can be varied considerably without departing from the basic principles of the invention.

What is claimed is:

1. A method for thermo-vacuum drying an object, the method comprising:

inserting the object into a dryer vessel;

generating a high-pressure gaseous flow; and introducing at least a portion of the high-pressure gaseous flow into a vacuum ejector from a first inlet of the vacuum ejector to an outlet of the vacuum ejector, to create a vacuum though a second inlet of the vacuum ejector, the second inlet connected to the dryer vessel to create a vacuum evacuating evaporated moisture mixed with air from the dryer vessel through the second inlet.

2. The method of claim 1 wherein the high-pressure gaseous flow comprises steam or compressed air.

3. The method of claim 1 wherein the high-pressure gaseous flow does not pass through the dryer vessel.

4. The method of claim 1 additionally comprising:

applying heat to the object in the dryer vessel to evaporate moisture from the object within the dryer vessel.

5. The method of claim 4 wherein the heat is provided by the gaseous flow exiting the vacuum ejector mixed with the moisture evacuated from the dryer vessel.

6. The method of claim 1 wherein the object is clothing, food or an agriculture material.

7. The method of claim 1 wherein the dryer vessel comprises a continuous processing device configured to receive a wet particulate material at a first end and discharge a dry particulate material at a second end.

8. The method of claim 1 additionally comprising:

directing compressed air to the vacuum ejector to provide a motive flow to drive the vacuum ejector to affect the vacuum evacuating of the evaporated moisture mixed with air from the dryer vessel.

9. The method of claim 8 additionally comprising:

heating the compressed air upstream of the vacuum ejector.

10. The method of claim 8 wherein the object comprises an agricultural seed, plant, or food material.

11. A method for thermo-vacuum drying an object, the method comprising:

receiving the object into a thermo-vacuum dryer vessel;

generating a high-pressure gaseous flow;

introducing the high-pressure gaseous flow through a vacuum ejector, from a first inlet of the vacuum ejector to an outlet of the vacuum ejector, to create a vacuum though a second inlet of the vacuum ejector, the second inlet connected to the thermo-vacuum dryer vessel;

evacuating evaporated moisture from the dryer vessel through the second inlet of the vacuum ejector, wherein each of the gaseous flow and the evaporated moisture from the dryer vessel exit the outlet of the vacuum ejector.

12. The method of claim 11 additionally comprising:

applying heat to the object in the thermo-vacuum dryer vessel for evaporating moisture from the object within the dryer vessel.

13. The method of claim 12 wherein the heat is indirectly applied through a heat exchanger in combination with the dryer vessel.

14. The method of claim 13 wherein the heat exchanger surrounds the dryer vessel and receives heat from the outlet of the vacuum ejector, and no high-pressure gaseous flow nor evaporated moisture from the outlet of the vacuum ejector contacts the object within the dryer vessel.

15. The method of claim 11 additionally comprising:

directing at least a portion of evacuated moisture from the thermo-vacuum dryer vessel to a recuperative heat exchanger to condense moisture and separate at least a portion of condensed moisture, wherein the recuperative heat exchanger acts on at least a portion of the evaporated moisture to form a condensate.

16. The method of claim 11 additionally comprising:

post-drying treatment of the object within the dryer vessel by condensing of a portion of the gaseous flow mixed with evaporated moisture from the outlet of the vacuum ejector with a refrigerant and at a high-pressure to generate a cooling capacity to cool and/or freeze the object within the dryer vessel.

17. A system for thermo-vacuum drying an object, the system comprising:

a thermo-vacuum dryer vessel to apply vacuum to an object therein contained to evaporate moisture from the object; and a vacuum ejector in communication with the thermo-vacuum dryer vessel, the vacuum ejector having a gaseous flow passage, including a flow inlet and a flow outlet, and a moisture inlet connected to the thermo-vacuum dryer vessel, and the vacuum ejector, upon actuation, to affect evacuation of at least a portion of evaporated moisture from the thermo-vacuum dryer vessel through the moisture inlet.

18. The system of claim 17 wherein the gaseous flow passage is configured to receive a high pressure flow of air or steam.

19. The system of claim 17, additionally comprising:

a compressor configured to generate high-pressure air, the compressor in pressurized air transfer communication with the vacuum ejector to affect the evacuation of evaporated moisture mixed with air from the dryer vessel.

20. The system of claim 17, additionally comprising:

a heat exchanger integrated with the dryer vessel configured to receive outlet vapor from the vacuum ejector and transfer heat to the dryer vessel from the outlet vapor, wherein no outlet vapor from the outlet of the vacuum ejector contacts the object within the dryer vessel.

* * * * *